(12) United States Patent
Jeon et al.

(10) Patent No.: US 8,511,407 B2
(45) Date of Patent: Aug. 20, 2013

(54) HYBRID FUEL CELL VEHICLE WITH MULTI-POWER SOURCE AND MULTI-DRIVE SYSTEM AND METHOD OF CONTROLLING THE SAME

(75) Inventors: Soon Il Jeon, Gyeonggi-do (KR); Sang Uk Kwon, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/207,898

(22) Filed: Aug. 11, 2011

(65) Prior Publication Data
US 2012/0035796 A1 Feb. 9, 2012

Related U.S. Application Data

(62) Division of application No. 12/218,816, filed on Jul. 17, 2008, now Pat. No. 8,016,061.

(30) Foreign Application Priority Data

Mar. 4, 2008 (KR) ........................ 10-2008-0020173

(51) Int. Cl.
*B60W 10/00* (2006.01)
*B60W 10/08* (2006.01)
*B60W 10/28* (2006.01)

(52) U.S. Cl.
USPC ............... 180/65.265; 180/65.28; 180/65.285

(58) Field of Classification Search
USPC .............................................. 180/65.1–65.29
See application file for complete search history.

(56) References Cited

U.S. PATENT DOCUMENTS

| | | | |
|---|---|---|---|
| 6,223,844 B1 | 5/2001 | Greenhill et al. | |
| 6,923,279 B2 | 8/2005 | Shimane et al. | |
| 7,000,000 B1 | 2/2006 | O'Brien et al. | |
| 2004/0145338 A1* | 7/2004 | Nakamura et al. | 318/801 |
| 2009/0183934 A1 | 7/2009 | Oyobe et al. | |
| 2009/0255744 A1* | 10/2009 | Kitano | 180/65.285 |

FOREIGN PATENT DOCUMENTS

| | | |
|---|---|---|
| JP | 2003-333707 | 11/2003 |
| JP | 2004-112956 | 4/2004 |
| JP | 2005-050758 | 2/2005 |
| JP | 2005-065041 | 3/2005 |

* cited by examiner

*Primary Examiner* — Jeffrey J Restifo
*Assistant Examiner* — Erez Gurari
(74) *Attorney, Agent, or Firm* — Edwards Wildman Palmer LLP; Peter F. Corless

(57) ABSTRACT

A hybrid fuel cell vehicle with a multi-power source and a multi-drive system includes: a plurality of primary power sources sharing a single main bus terminal and connected in parallel to each other; a plurality of drive systems receiving power from the main bus terminal to generate output torque so as to drive vehicle wheels and connected in parallel to each other; and an auxiliary power source sharing the main bus terminal and disposed between the primary power sources and the drive systems to supplement power shortage of the primary power sources.

2 Claims, 16 Drawing Sheets

HYBRID FUEL CELL VEHICLE WITH MULTI-POWER SOURCE AND MULTI-DRIVE SYSTEM AND METHOD OF CONTROLLING THE SAME

CROSS-REFERENCE TO RELATED APPLICATION

This application is a Divisional of U.S. patent application Ser. No. 12/218,816, filed Jul. 17, 2008, which claims under 35 U.S.C. §119(a) the benefit of Korean Patent Application No. 10-2008-0020173 filed Mar. 4, 2008, the entire contents of which are incorporated herein by reference.

BACKGROUND (a) Technical Field

The present invention relates to a hybrid fuel cell vehicle with a multi-power source and a multi-drive system and a method of controlling the same. More particularly, the present invention relates to a hybrid fuel cell vehicle having a plurality of power sources and a plurality of drive systems, by which overall reliability of the vehicle is ensured even when any one of the power sources or drive systems fails.

(b) Background Art

A fuel cell system is a power generation system that directly converts chemical energy of fuel into electrical energy, in which a pair of electrodes including an anode and a cathode is disposed on both sides of an electrolyte membrane such that electricity and heat are produced by an electrochemical reaction of ionized gas.

FIG. 14 is a schematic diagram showing a powertrain employed in a conventional fuel cell hybrid vehicle with a supercapacitor.

As shown in the figure, the fuel cell hybrid vehicle includes a fuel cell stack 100, a supercapacitor 120, an inverter 130, a motor 140, a reduction gear unit (RGU) 150, and a gear differential unit (GDU) 160.

The most widely used fuel cell stack 100 in a vehicle is a proton exchange membrane fuel cell (PEMFC) having a high power density. The process for generating electricity in the PEMFC is as follows.

Hydrogen gas at an anode of the PEMFC is dissociated into hydrogen ions and electrons by a reaction with a catalyst on the surface of a fuel electrode. The hydrogen ions pass through the electrolyte membrane to move to an air electrode disposed on the opposite side of the fuel electrode and, at the same time, the electrons produced by the reaction with the catalyst move along an external circuit, thus generating electricity.

The fuel cell stack 100 is a primary power source for driving the vehicle and forms a fuel cell system in which two 100 kW fuel cells are connected in series to each other. The supercapacitor 120 serves as an auxiliary power source capable of rapidly charging and discharging high power. The supercapacitor 120 supplements insufficient power of the fuel cell stack 100 with electrical energy stored therein and makes the maximum use of regenerative braking energy, thus allowing efficient use of the fuel cell.

The high voltage output from the primary power source and the auxiliary power source is converted from direct current to alternating current by the inverter 130 and supplied to the motor 140 (e.g., AC 240 kVV) to drive the vehicle.

Here, since the two fuel cells 100 are connected in series to each other, a main bus terminal 102 is sustained at a high voltage (500 to 900 V), and the output torque of the motor 140 is firstly increased by the RGU 150 and further increased by the GDU 160 without use of any stepped transmission.

The speed reduction ratios of the RGU 150 and GDU 160 are configured to improve hill-climbing, acceleration and overtaking performance, which is well suited to a large-scale fuel cell vehicle including a bus.

In the fuel cell vehicle employing the fuel cells connected in series and the large-sized motor 140, the maximum speed of the vehicle is limited by the speed limit of the large-sized motor 140 and, in the event that the speed reduction ratio is decreased to increase the vehicle speed, the climbing performance may be deteriorated. On the contrary, in the event that the RGU 150 and the GDU 160 are designed to provide excellent climbing, acceleration, and overtaking performance of the fuel cell bus, the maximum speed of the motor 140 may be limited, and thus the vehicle cannot drive at a certain speed (e.g., 80 kph). Moreover, in the event that any one of the fuel cell, modules goes to fail, entire fuel modules cannot be functions properly since the fuel cells 100 are connected in series to each other, and thus the supercapacitor 120 would be only available alternative to drive vehicle. However, since the supercapacitor 120 is configured to serves as a supplementary power, it cannot last for long time. Therefore, the vehicle should be taken to a repair shop to replace the abnormal fuel cell module. Accordingly, weakness of the fuel cell module with a serial structure is lack of reliability in an emergency.

FIG. 15 is a schematic diagram showing a powertrain of a fuel cell bus proposed by Toyota. The fuel cell bus comprises two set of powertrains each including a fuel cell system composed of a 90 kW fuel cell module 110, a DC-DC converter 124, a high-voltage battery 123, an inverter 131, and a motor 141. That is, the two fuel cell systems are electrically isolated, and the outputs of two motors 141 are mechanically coupled by a power coupling device (PCD) 154. Here, the PCD 154 has a structure in which a gear directly connected to rear wheels is engaged with a (spur) gear directly connected between the two motors 141 to transmit the output of the motors to the rear wheels.

Moreover, the fuel cell bus further employs two high-voltage batteries 123 as an auxiliary power source to increase power assist and regenerative braking energy of the high-capacity bus. Accordingly, with the use of the two electrically isolated fuel cell systems, two main bus terminals 112 are sustained at a low voltage (250 to 450 V), and the output torque of the motor 141 may be increased by a gear ratio between the RGU 150 and GDU 160 without use of any stepped transmission.

In case of a hybrid fuel cell bus employing a supercapacitor as an auxiliary power source, a component that has a large volume and is hard to control, such as the DC-DC converter used in the battery-fuel cell hybrid vehicle, is not required, but a precharge device for charging the supercapacitor during initial start-up is required. Accordingly, considering that the fuel cells occupy a significant portion of the manufacturing cost and layout of the fuel cell bus, there is a limit in increasing the maximum power of the motor due to the increase in manufacturing cost and the layout problem of the fuel cells.

Meanwhile, FIG. 16 shows a fuel cell bus employing a single fuel cell system 101 and a single large-sized motor 143, in which electrical power is supplied to the single large-sized motor 143 using only the fuel cell system 101 having a capacity of about 205 kW. Since the above fuel cell bus does not use any supplementary power source such as a battery or a supercapacitor, it is impossible to provide power assist, and thus the fuel cell system may be operated excessively, resulting in deterioration of durability of the fuel cell system. Moreover, since it is impossible to absorb regenerative braking energy, the energy efficiency may be reduced. Furthermore, since the single fuel cell 101 and the single large-sized motor 143 are used, it is difficult to ensure driving stability in an emergency where the fuel cell 101 or the motor 143 malfunctions.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with the prior art.

In one aspect, the present invention provides a hybrid fuel cell vehicle with a multi-power source and a multi-drive system, the hybrid fuel cell vehicle comprising: a plurality of primary power sources sharing a single main bus terminal, the primary power sources being connected in parallel to each other; a plurality of drive systems receiving power from the main bus terminal to generate output torque so as to drive vehicle wheels, the drive systems being connected in parallel to each other; and an auxiliary power source sharing the main bus terminal and disposed between the primary power sources and the drive systems to supplement power shortage of the primary power sources.

In another aspect, the present invention provides a method of controlling a hybrid fuel cell vehicle with a multi-power source and a multi-drive system, the method comprising: determining whether a portion of a plurality of power sources is used (mild mode) or all of the plurality of power sources are used (power mode), using a push button by a driver or a driving pattern automatic recognition function by a controller; and operating a portion of the plurality of power sources if the vehicle is driven in a mild mode, and operating all of the plurality of power sources if the vehicle is driven in a power mode.

In a further aspect, the present invention provides a method of controlling a multi-motor system of a hybrid fuel cell vehicle with a multi-power source and a multi-drive system, the method comprising independently controlling output power of a plurality of motor systems in consideration of efficiency of the respective motor systems in order to satisfy a total motor power command value.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like.

The above and other features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinafter by way of illustration only, and thus are not limitative of the present invention, and wherein.

Figure 1:
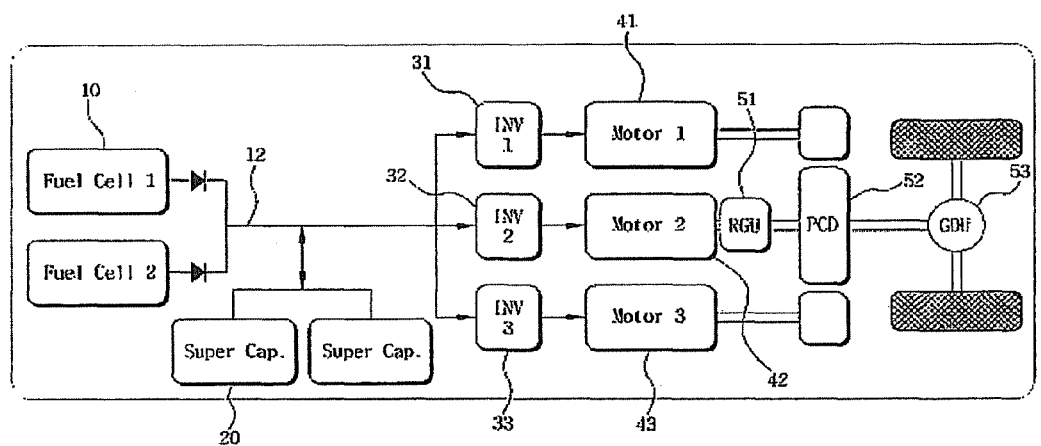
FIG. 1 is a schematic diagram showing a powertrain of a hybrid fuel cell vehicle in accordance with a preferred embodiment of the present invention.

Reference numerals set forth in the Drawings includes reference to the following elements as further discussed below:

| | |
|---|---|
| 10, 11: fuel cell | 12: main bus terminal |
| 20, 21: supercapacitor | 23: battery |
| 24: DC-DC converter | 31 to 33: inverter |
| 41 to 43: first to third motor | 51: reduction gear unit (RGU) |
| 52: power coupling device (PCD) | 53: gear differential unit (GDU) |
| 54: universal joint | 55: sun gear |
| 56: ring gear | 57: carrier |
| 62, 63: two-row gear unit | 71: vehicle control unit (VCU) |
| 72: fuel cell control unit (FCU) | 73: power control unit (PCU) |
| 74: motor control unit (MCU) | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to the preferred embodiments of the present invention, examples of which are illustrated in the drawings attached hereinafter, wherein like reference numerals refer to like elements throughout. The embodiments are described below so as to explain the present invention by referring to the figures.

FIG. 1 is a schematic diagram showing a powertrain of a hybrid fuel cell vehicle in accordance with a preferred embodiment of the present invention.

In general, since the fuel cell used as a primary power source in the conventional hybrid fuel cell vehicle has a unidirectional characteristic, it produces electricity and water by an electrochemical reaction between hydrogen and oxygen, but it cannot store electrical energy.

Accordingly, in a case where only the fuel cell, 10, 11 is used as a primary power source, the fuel cell 10, 11 may be used excessively, and thus the durability may be deteriorated. Especially, in a case where a single fuel cell 101 or a plurality of serially connected fuel cells 100 are used, the overall system may be shut down due to a malfunction of the single fuel cell 101 or one of the fuel cells 100, thus causing a serious problem that the vehicle may be stopped.

Moreover, the manufacturing cost of the fuel cell is high and thus occupies a significant portion of the total manufacturing cost of the fuel cell vehicle. Furthermore, since considerable expense is required to provide balance of plant (BOP) components for operating the fuel cell system, it is necessary to reconsider the efficiency in terms of fuel consumption.

Under such circumstances, it is essential to use an auxiliary power source in addition to the primary power source such as the fuel cell so as to meet the demands of today's society for increased use of environment-friendly fuel cell vehicles.

At present, the fuel cell system used in the fuel cell bus employs a 200 kW fuel cell 101 or two serially connected 100 kW fuel cells 100. The auxiliary power source used in the fuel cell vehicle may be exemplified by a battery 23 and a supercapacitor 20, 21.

In the case where the battery 23 is used as the auxiliary power source, a bidirectional DC-DC converter 24 is connected in parallel between the fuel cell 10 and the battery 23. The bidirectional DC-DC converter 24 maintains the balance of different output voltages of the battery 23 and the fuel cell 10 to stably supply power to a plurality of motors 41 to 43 and, at the same time, provides surplus power and regenerative braking energy of the fuel cell 10 to the battery 23 as a charging voltage.

In the case where the supercapacitor 20, 21 is used as the auxiliary power source, insufficient output power of the fuel cell is compensated by the supercapacitor 20, 21 and monitored. Moreover, a component that has a large volume and is hard to control, such as the DC-DC converter 24 used in a battery-fuel cell hybrid vehicle, is not required.

The present invention provides a plurality of power sources and a plurality of drive systems. As described above, in the case where a single power source or a plurality of fuel cells connected in series to each other are used, it is impossible to ensure driving stability in an emergency where the single power source or one of the fuel cells malfunctions. In order to solve the above problem, it is necessary to employ a plurality of power sources, fuel cells 10, 11.

However, since the price of the fuel cell is high, an available maximum power of the fuel cell may be limited and, assuming that a fuel cell used in the conventional fuel cell bus has a capacity of 200 kW, it is necessary to divide the 200 kW fuel cell into two 100 kW fuel cells 10 so as to use the plurality of power sources while maintaining the existing output power (refer to FIG. 1). Of course, it is possible to divide the 200 kW fuel cell into four 50 kW fuel cells 11 (refer to FIG. 2).

In the present invention, a primary power source system has a basic structure, in which the power source system is divided into a plurality of fuel cells while maintaining the output power of the existing fuel cell, and the divided fuel cells 10, 11 are connected in parallel to each other and share a single main bus terminal 12.

As above, in the case where two 100 kW fuel cells 10 or four 50 kW fuel cells 11 are connected in parallel to each other and the single main bus terminal 12 is provided to be shared thereby, the output voltage of the fuel cell 10, 11 is 250 to 450 V, which is reduced to about half of that of the single, high-capacity fuel cell 101 or the serially connected fuel cells 100.

However, in case of a vehicle equipped with a 80 to 90 kW proton exchange membrane fuel cell stack, it has an output range of 0 to 5 kW in a start-up, deceleration, or stop mode, an output range of 10 to 15 kW in a cruise mode, and an output range of 20 to 90 kW in a starting, climbing, or acceleration mode. Accordingly, although the voltage supplied through an output terminal of the fuel cell is reduced to about half that of the existing high-capacity fuel cell 101 or the serially connected fuel cells 100, it does not cause any problem in the start-up, deceleration, stop, and cruise modes.

Instead, in order to increase the power performance in the starting, climbing, and acceleration modes, the present invention provides a plurality of drive systems, i.e., adds a motor 43, to increase the driving torque of the vehicle during starting, climbing, and acceleration.

Of course, the output performance is improved when three drive motors 41 to 43 are installed in the present invention, compared with the conventional fuel cell bus equipped with two motors 41 and 42.

Moreover, although the battery 23 may be used as the auxiliary power source in the present invention, it is preferable to use the supercapacitor 20, 21 as the auxiliary power source for the above-described reason. In this case, as the auxiliary power source, two 19.4 F supercapacitors 20 may be used (refer to FIGS. 1 and 2), or a 38.8 F supercapacitor 21 may be used (refer to FIG. 3).

The voltage output from the primary power source or the auxiliary power source through the single main bus terminal 12 is converted from direct current to alternating current by inverters 31 to 33 and supplied to the motors 41 to 43.

The drive system in accordance with the present invention includes three re more motors. For example, an embodiment of the present invention includes three motors 41 to 43 connected in parallel to each other and controlled independently. The three motors 41 to 43 and three corresponding inverters are connected in parallel to the single main bus terminal 12 such that the voltage of the main bus terminal 12 is independently supplied to the 100 kW motors 41 to 43. Moreover, the plurality of motors 41 to 43 are coupled by a reduction gear unit (RGU) 51, a power coupling device (PCD) 52, and a gear differential unit (GDU) 53.

Figure 6:
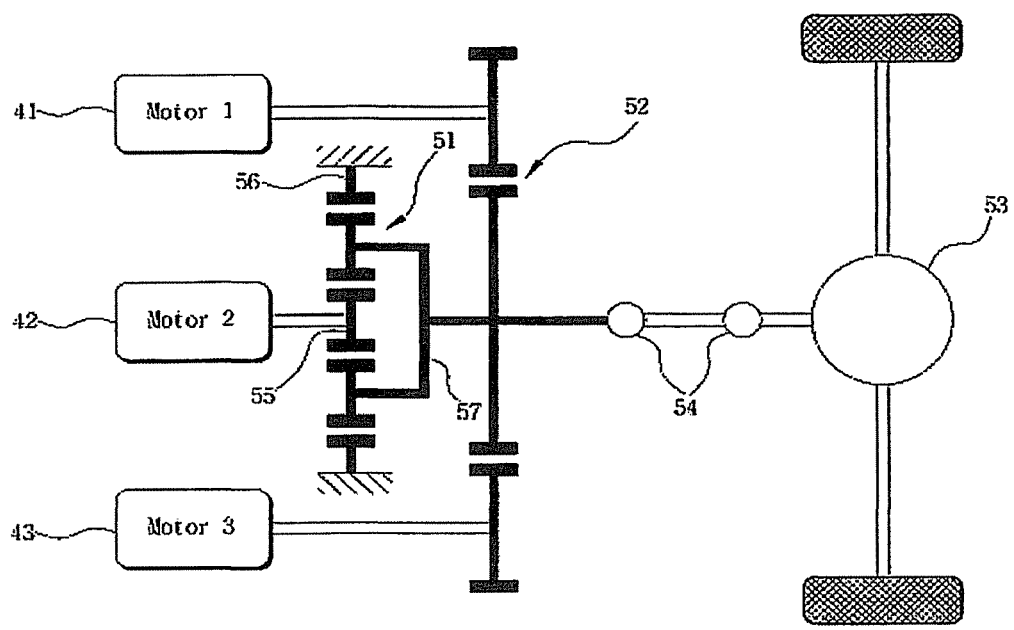
FIG. 6 is a schematic diagram showing a gear means in accordance with a preferred embodiment of the present invention.

As shown in FIG. 6, the drive system in accordance with the preferred embodiment of the present invention includes first to third motors 41 to 43 sharing a single main bus terminal and connected in parallel to each other, and a PCD 52, in which output shafts of the first and third motors 41 and 43 are directly connected to an input thereof and the second motor 42 is coupled thereto through the RGU 51.

The RGU 51 is used to maximize the output torque of the second motor 42 and may be implemented in combination with a planetary gear together with the PCD 52.

That is, a sun gear 55 of the RGU 51 is connected to the output shaft of the second motor 42, a ring gear 56 is fixed, and a carrier shaft is connected to the PCD 52 such that the output torque of the second motor 42 is increased by a carrier 57. In this case, the gear between the RGU 51 and the PCD 52 is designed to make the first to third motors 41 to 43 have the same torque increase rate. Moreover, the final output shaft passing through the PCD 52 is connected to the GDU 53 through a universal joint 54.

The reason why the second motor 42 is connected to the PCD 52 through the RGU 51 is as follows. In a case where the first to third motors 41 to 43 have a capacity of 100 kW, respectively, and the second motor 42 is directly connected to the PCD 52 without use of the RGU 51, it is impossible to maximize the driving torque of the vehicle, and the maximum speed of the vehicle is limited by the maximum rotational speed of the second motor 42. Accordingly, by connecting the second motor 42 to the PCD 52 through the RGU 51, the outputs of the first to third motors 41 to 43 can be increased by the same gear ratio, and thus it is possible to maximize the driving torque of the vehicle while reducing the maximum speed limit of the vehicle.

Moreover, the speed reduction ratio between the RGU 51, PCD 52, and GDU 53 is designed to ensure sufficient climbing performance and improve the maximum speed and the acceleration and overtaking performance.

Figure 7:
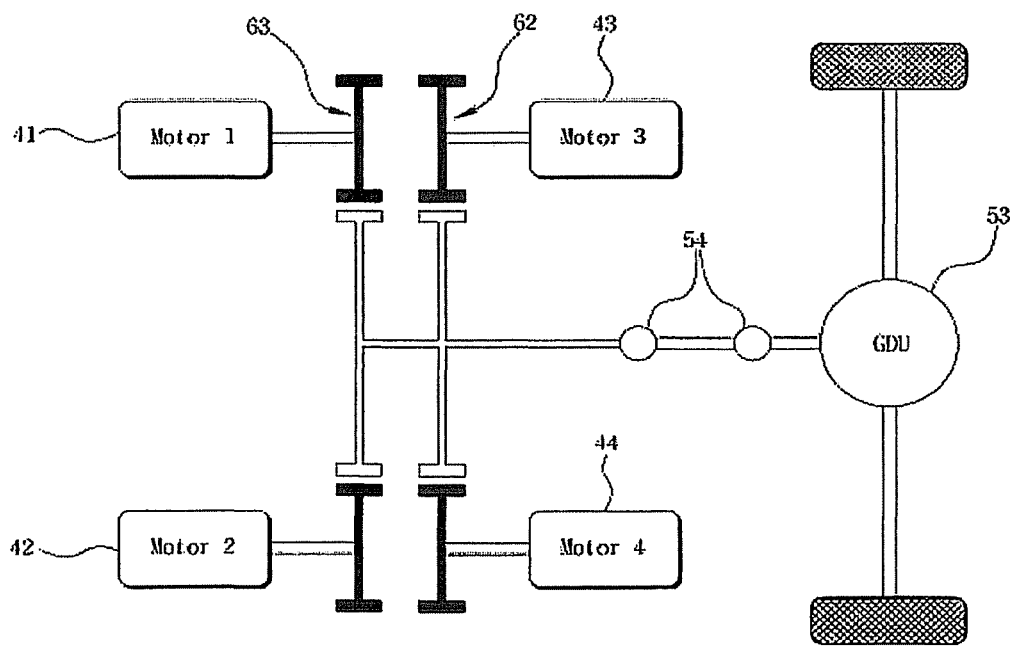
FIG. 7 is a schematic diagram showing a gear means in accordance with another preferred embodiment of the present invention.

As shown in FIG. 7, a drive system in accordance with another preferred embodiment of the present invention includes first to fourth motors 41 to 44 sharing a single main bus terminal and connected in parallel to each other, and a two-row gear unit 62, 63 connected between two motors such that the first and third motors 41 and 43 are directly connected to each other and the second and fourth motors 42 and 44 are directly connected to each other.

That is, the first to fourth motors 41 to 44 are coupled by the two-row gear units 62 and 63, and the two-row gear units 62 and 63 are designed to make the motors 41 to 44 have the same torque increase rate. In this case, the fourth motor 44 may be excluded. Moreover, the final output shaft of the two-row gear units 62 and 63 is connected to a GDU 53 through a universal joint 54.

Although the drive systems of the present invention have been described with respect to preferred embodiments in which three or four motors are used to improve the power performance of the vehicle, it will be apparent to those skilled in the art that more than four motors may be used.

Figure 2:
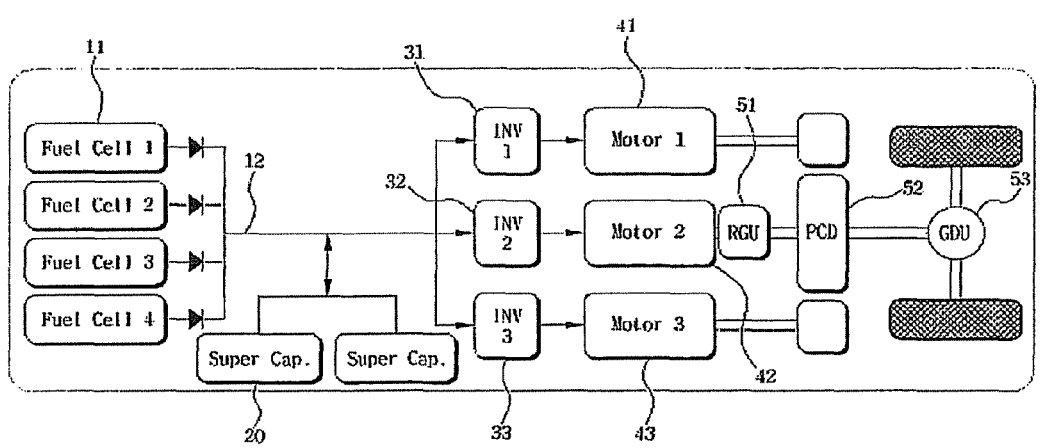
FIG. 2 is a schematic diagram showing a powertrain of a hybrid fuel cell vehicle in accordance with another preferred embodiment of the present invention.
Figure 3:
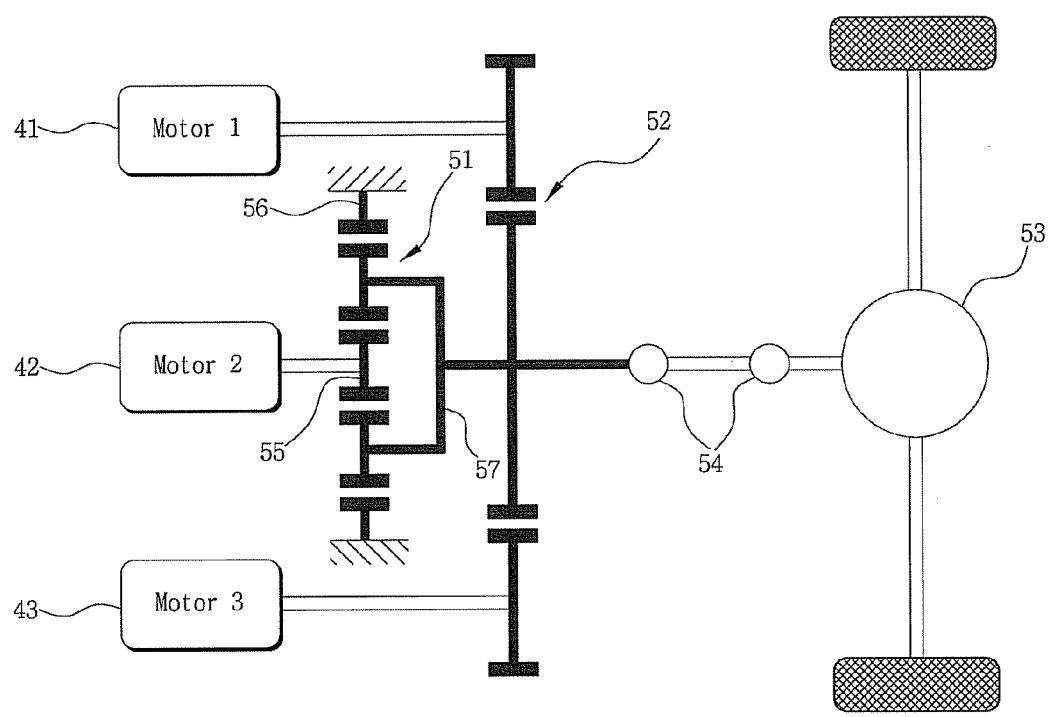
FIG. 3 is a schematic diagram showing a powertrain of a hybrid fuel cell vehicle in accordance with still another preferred embodiment of the present invention.
Figure 4:
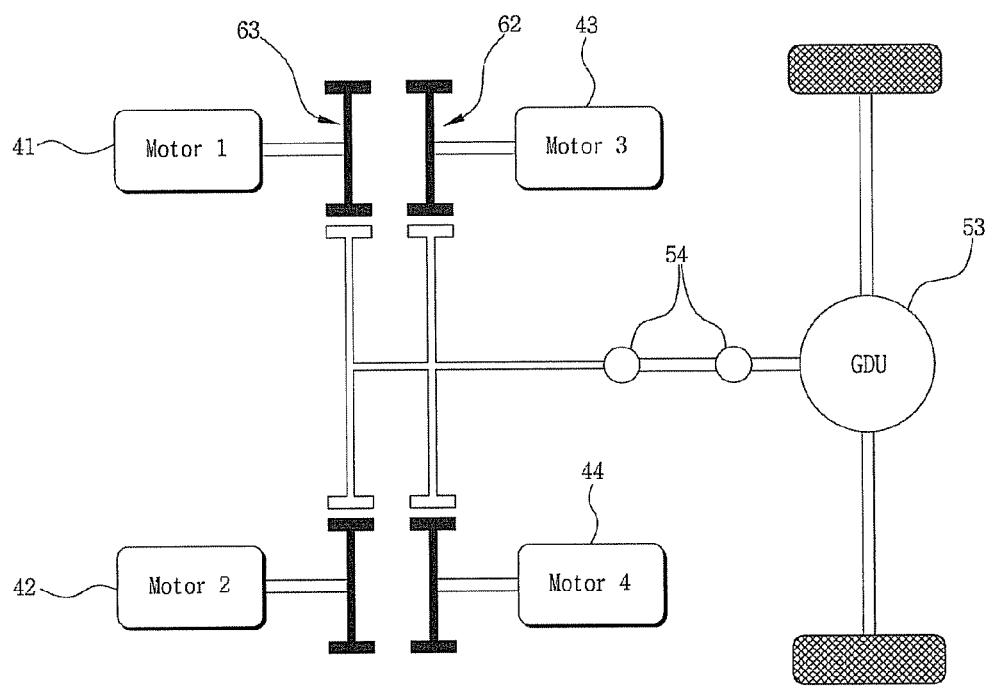
FIG. 4 is a schematic diagram showing a powertrain of a hybrid fuel cell vehicle in accordance with yet another preferred embodiment of the present invention.
Figure 5:
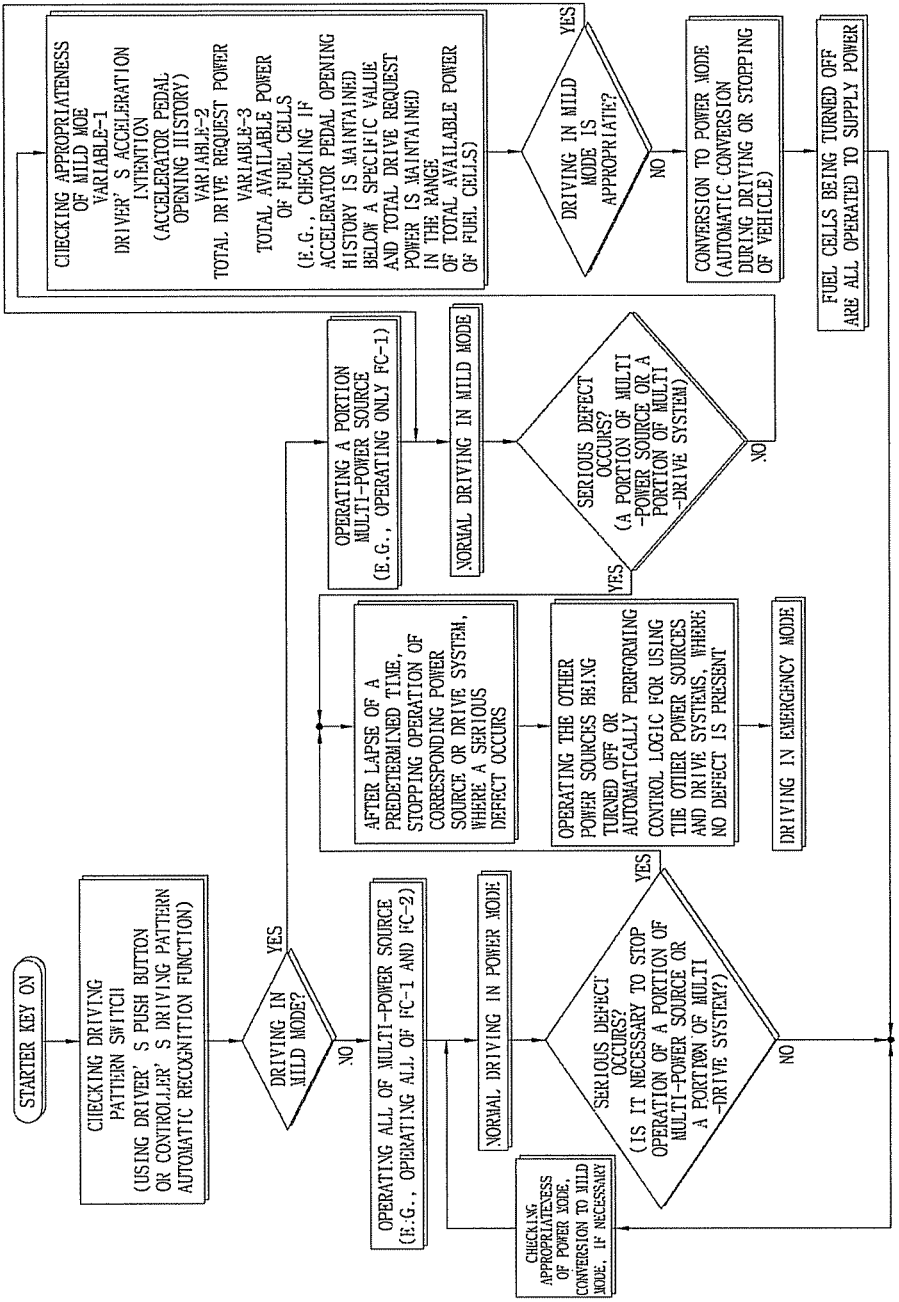
FIG. 5 is a flowchart illustrating a method of controlling the hybrid fuel cell vehicle in accordance with the present invention.

FIGS. 2 to 4 are schematic diagrams showing modified powertrains of hybrid fuel cell vehicles employing a multi-power source and a multi-drive system in accordance with other preferred embodiments of the present invention.

FIG. 2 shows a hybrid fuel cell vehicle including four 50 kW fuel cells 11 used as a primary power source and connected in parallel to each other, two 19.4 F supercapacitors 20 used as an auxiliary power source and connected in parallel between the fuel cells 11 and motors 41 to 43, and three 100 kW motors 41 to 43 used for driving the vehicle.

FIG. 3 shows a hybrid fuel cell vehicle including two 100 kW fuel cells 11 used as a primary power source and connected in parallel to each other, a 38.8 F supercapacitor 21 used as an auxiliary power source and connected in parallel between the fuel cells 10 and motors 41 to 43, and three 100 kW motors 41 to 43 used for driving the vehicle.

FIG. 4 shows a hybrid fuel cell vehicle including two 100 kW fuel cells 11 used as a primary power source and connected in parallel to each other, two batteries 23 used as an auxiliary power source and connected in parallel between the fuel cells 10 and motors 41 to 43, two DC-DC converters 24 connected in parallel between the fuel cells 10 and motors 41 to 43, and three 100 kW motors 41 to 43 used for driving the vehicle.

The operation of the hybrid fuel cell vehicle with the multi-power source and the multi-drive system in accordance with the present invention will be described below.

In the fuel cell-supercapacitor hybrid vehicles, the plurality of fuel cells 10 shares the single main bus terminal 12, and the supercapacitors 20 also share the main bus terminal 12 to supplement power shortage of the fuel cells 10. The voltage of the main bus terminal 12 output from the fuel cells 10 or the supercapacitors 20 is independently supplied to the plurality of motors 41 to 43 through the inverters 31 to 33. At this time, the torque of the first and third motors 41 and 43 is increased by the gear ratio of the PCD 52 and delivered to the respective vehicle wheels through the GDU 53, and the torque of the second motor 42 is increased to the same level as the first and third motors 41 and 43 by the RGU 51, the PCD 52, and the GDU 53 and delivered to the vehicle wheels.

The fuel cell-battery hybrid vehicle has the same operation as the above fuel-cell-supercapacitor hybrid vehicles.

Moreover, in the hybrid fuel cell vehicle that uses the battery 23 or the supercapacitor 20, 21 as the auxiliary power source, during regenerative braking, the respective motors 41 to 43 receives kinetic energy from the respective vehicle wheels through the RGU 51, the PCD 52, and the GDU 53 to generate electrical energy and stores the same to the battery 23 or the supercapacitor 20, 21.

The present invention having the above configuration and operation uses the plurality of power sources and at least three drive systems such that, in the event that one of the power sources or drive systems malfunctions, the other power sources and drive systems connected in parallel to each other are used to perform an emergency operation, thus ensuring safety of the driver and passengers.

Moreover, since the plurality of power sources shares the single main bus terminal 12, it is possible to add at least three drive systems, while maintaining the capacity of the existing power source, thus significantly improving the climbing performance, the maximum speed, and the acceleration and overtaking performance, compared with the existing power source having the same capacity.

Furthermore, since it is possible to supply power to three or more drive systems without increasing the number of the fuel cell systems to the number of motors, the material cost can be reduced due to the reduction in the number of the fuel cells 10.

In addition, in the event that it is necessary to replace any of the fuel cells 10 or any of the motors 41 to 43 for various reasons such as aging and malfunction, it is possible to independently replace the corresponding fuel cell or motor, and thus the maintenance and repair are convenient and the replacement cost can be reduced.

Additionally, it is possible to reduce the overall volume and weight of the multi-drive system having at least three motors 41 to 43, compared with those of the single large-sized motor, and it is also possible to build a distributed package using dead space of the vehicle due to the parallel connection of the power sources.

Lastly, any of the plurality of parallel connected fuel cells 10 or any of the three or more motors may be turned off during normal driving (in a mild mode where a request power is low during driving) or an idle stop control may be performed, and thus it is possible to improve fuel efficiency and operational life of the system.

Next, a method of controlling the hybrid fuel cell vehicle with the multi-power source and the multi-drive system in accordance with the present invention will be described.

Control logic in accordance with the present invention include five modes such as (1) a mild mode where a portion of the multi-power source (e.g., fuel cells 10) is used, (2) a power mode where the overall multi-power source is used, (3) a conversion mode for converting the mild mode to the power mode by determining the appropriateness of the operation during driving, (4) a conversion mode for converting the power mode to the mild mode, and (5) an emergency mode where it is necessary to stop the operation of a portion of the multi-power source or a portion of the multi-drive system.

First, upon start-up, it is determined whether the vehicle is operated in the mild mode or the power mode by operation of a push button by a driver or by a driving pattern automatic recognition function by a controller.

The push button is mounted in the vicinity of a drivers seat so that the driver may manually operate the bush button by determining the driving state. During normal driving, the driving pattern of the driver is automatically recognized by the controller; however, the push button is used by the driver as occasion demands.

In the present invention, the driving pattern automatic recognition function related to the mild and power modes is a technique in which a mode used just before a starter key is turned off is stored in a buffer of the controller and then used as it is when the starter key is turned on, or a technique in which a history of modes (about 1 to 3) used just before the starter key is turned off and a history of modes (about 1 to 3) used thereafter are stored in the controller such that the history of modes used just before the starter key is turned off is used as an input and a mode (mild or power mode) to be used when the starter key is turned on is determined as an output.

In the step of determining the mild or power mode, if the vehicle is in the power mode, the overall multi-power source is operated to perform a normal driving in the power mode. In case of the mild mode, a portion of the multi-power source is operated to perform a normal driving in the mild mode.

Subsequently, after the lapse of a predetermined time, the appropriateness of the mild mode is continuously checked during driving in the mild mode based on three control variables such as a driver's acceleration intention (accelerator pedal opening history) a total drive request power, and a total available power. In the event that the accelerator pedal opening history is maintained below a specific value and the total drive request power is maintained in the range of the total available power of the portion of the fuel cells 10, 11 being used, the normal driving in the mild mode is continued, otherwise, the conversion to the power mode is performed.

The mode conversion is automatically carried out during driving or stopping and, through the mode conversion from the mild mode to the power mode, the fuel cells 10, 11 being turned off are all operated to supply power.

Also, during driving in the power mode, the appropriateness of the power mode is continuously checked based on the above three control variables in the same manner as above. In the event that the accelerator pedal opening history is maintained below a specific value and the total drive request power is maintained sufficiently lower than the total available power of the overall fuel cells 10, 11, the conversion to the mild mode is performed.

The mode conversion is automatically carried out during driving or stopping like the above and, through the above mode conversion, a portion of the overall fuel cells 10, 11 being turned on is turned off and power is supplied only by the other fuel cells 10, 11 being turned on.

Next, the configuration of a controller for the mode conversion between the mild mode and the power mode, and a control method thereof will be described in more detail.

Figure 8:
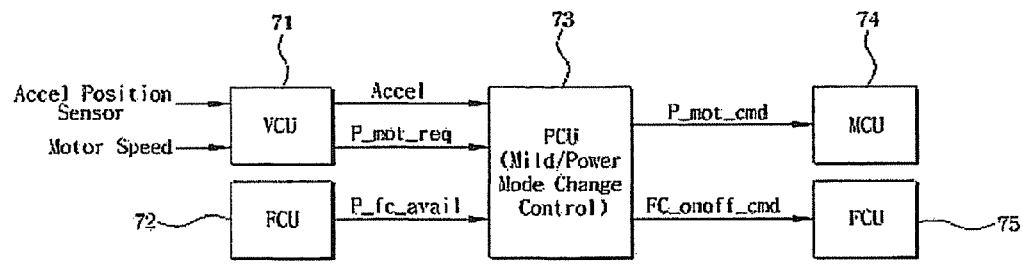
FIG. 8 is a schematic diagram showing a control device for the hybrid fuel cell vehicle with a multi-power source and a multi-drive system in accordance with the present invention.

As shown in FIG. 8, a vehicle control unit (VCU) 71 outputs a total drive request power (P_mot_req) with an input of an accelerator position sensor (APS) and a motor speed using a motor speed-torque characteristic map stored in the controller in the form of a look-up table.

Here, in case of the system using, for example, three motors, the total drive request power (P_mot_req) is calculated based on the outputs of all of the three motors without regard to whether the motors are used at present.

Moreover, the VCU 71 derives the driver's acceleration intention based on the accelerator position sensor. The driver's acceleration intention is expressed as Accel in the present embodiment and, an Accel signal denotes a signal filtered based on an accelerator position sensor signal to reflect the driver's acceleration intention.

A fuel cell control unit (FCU) 72 outputs a total available power (P_fc_avail) of the fuel cells based on whether the multi-power source is operated (for example, whether a portion of the fuel cells is operated under the mild mode or all of the full cells are operated under the power mode) and based on the operation conditions (for example, individual cell voltage levels according to temperature, pressure, flow, humidity, etc.).

A power control unit (PCU) 73 is a power controller or a hybrid controller that continuously determines the appropriateness of the mild mode and the power mode based on the input three variables such as Accel, P_mot_req, and P_fc_avail.

Figure 9:
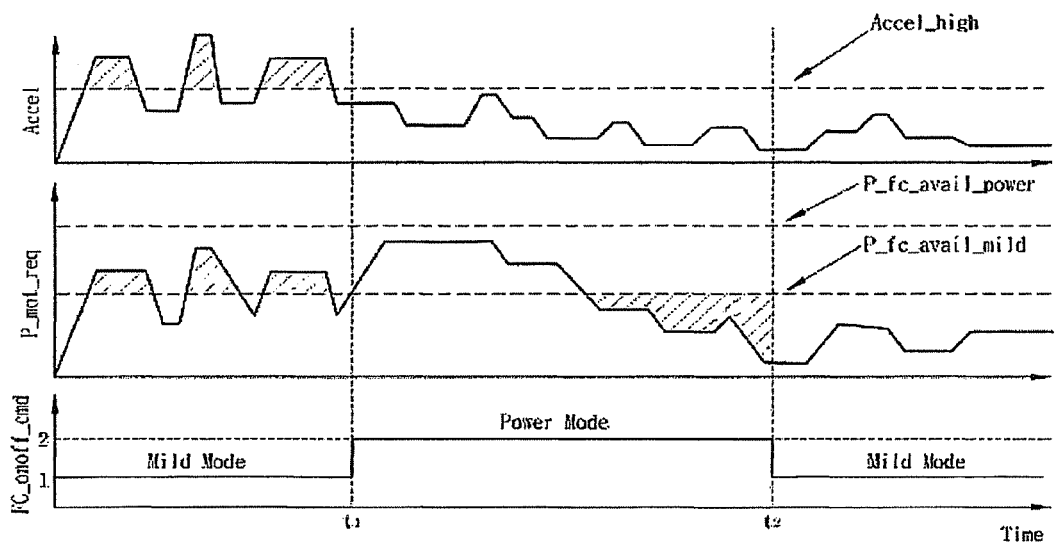
FIG. 9 is a graph showing an accelerator pedal opening history, a total drive request power, and a total available power of a fuel cell, which are used to determine the appropriateness of a corresponding mode in the fuel cell vehicle in accordance with the present invention.

That is, during driving in the mild mode, if a state in which Accel is greater than Accel_high (a reference value to determine the driver's acceleration intention), or a state in which P_mot_req is greater than P_fc_avail_mild occurs more than a predetermined number of times and more than a predetermined period of time (shaded portions in FIG. 9), the mild mode is converted to the power mode. However, in order to prevent frequent mode conversion, the next mode conversion is allowed after the lapse of a predetermined time from the previous mode conversion (i.e., a kind of hysteresis is employed).

Moreover, during driving in the power mode, if a state in which Accel is equal to or less than Accel_high and P_mot_req is equal to or less than P_fc_avail_mild occurs more than a predetermined number of times and more than a predetermined period of time (shaded portions in FIG. 9), the power mode is converted to the mild mode. Likewise, in order to prevent frequent mode conversion, the next mode conversion is allowed after the lapse of a predetermined time from the previous mode conversion (i.e., a kind of hysteresis is employed).

The PCU 73 determines the appropriateness of the mild mode and the power mode by the above method and transmits the result FC_onoff_cmd to the FCU 72 so that the FCU 72 operates a portion of the fuel cells (mild mode) or all of the fuel cells (power mode).

During driving in the mild or power mode, in the event that it is necessary to stop the operation of a portion of the multi-power source or a portion of the multi-drive system (upon occurrence of a serious defect), the vehicle is driven in the emergency mode by stopping the operation of the portion of the multi-power source or multi-drive system after the lapse of a predetermined time, and by operating the other power sources being turned off or by automatically performing a control logic for using the other power sources and drive systems, where no defect is present.

Here, the mode conversion during driving in the mild or power mode may be performed by either or both the determination of the appropriateness of the operation and the determination of the serious defect.

Moreover, the PCU 73 transmits a total motor power command value (P_mot_cmd) to a motor control unit (MCU) 74 in consideration of the total available power (P_fc_avail) and the available power of the auxiliary power source (e.g., supercapacitor) based on the total drive request power (P_mot_req).

Meanwhile, a method of controlling a multi-motor system in accordance with the present invention independently controls the output power of respective motor systems (for example, three or more motors) in consideration of the efficiency of the respective motor systems so as to satisfy the total motor power command value. In this case, the motor system includes the inverters 31 to 33 and the motors 41 to 44 connected in parallel to each other to receive power from the main bus terminal 12 shared by the multi-power source.

Figure 10:
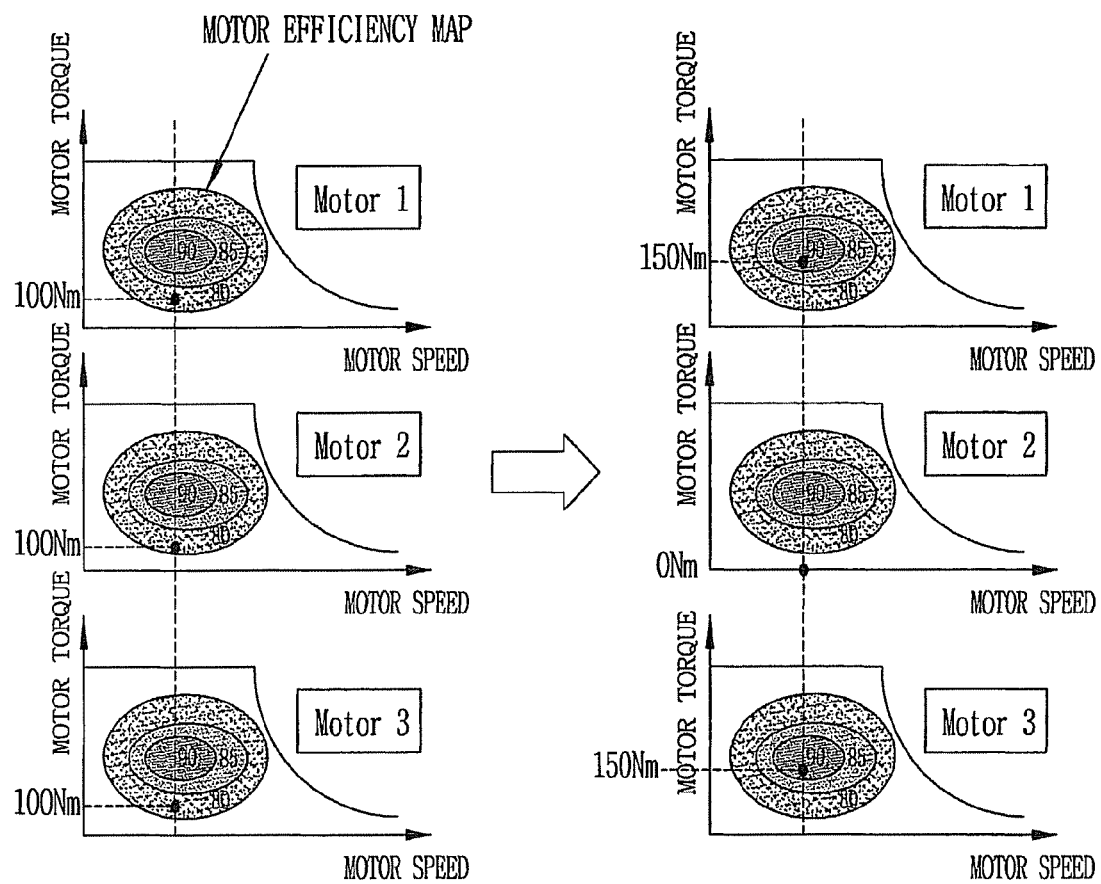
FIG. 10 is a conceptual diagram illustrating a method of controlling a multi-motor system in accordance with a preferred embodiment of the present invention.

For example, as shown in FIG. 10, in a case where the total motor power command value (P_mot_cmd) is 120 kW and the total request torque is 300 Nm at a given speed, if the motor power and torque are uniformly distributed to the three motors (i.e., 40 kW and 100 NM each), the efficiency of the respective motor systems is 80%. On the other hand, if the motor power and torque are uniformly distributed to two of the three motors (i.e., 60 kW and 150 Nm each) and the other motor is in an idle state (i.e., 0 Nm), the efficiency of the respective motor systems is improved to 90%, resulting in improvement of fuel efficiency.

Here, the reason why the total motor power command value is uniformly distributed to the two motors, not to the three motors, is that the efficiency of the respective motor systems may be varied according to the characteristics of the overall system even though they have the same specification. Accordingly, it is possible to improve the motor efficiency and fuel efficiency by distributing a larger motor power command value to the motor systems having a relatively high efficiency, while distributing no or smaller motor power command value to the motor system having a relatively low efficiency.

Accordingly, when the output power of the respective motor systems is independently controlled in consideration of the efficiency of the respective motor systems, the degree of freedom for the selection of the parallel connected motor systems is increased, and thus it is possible to supply more power to the vehicle wheels in terms of energy efficiency even though the same power is input.

Figure 11:
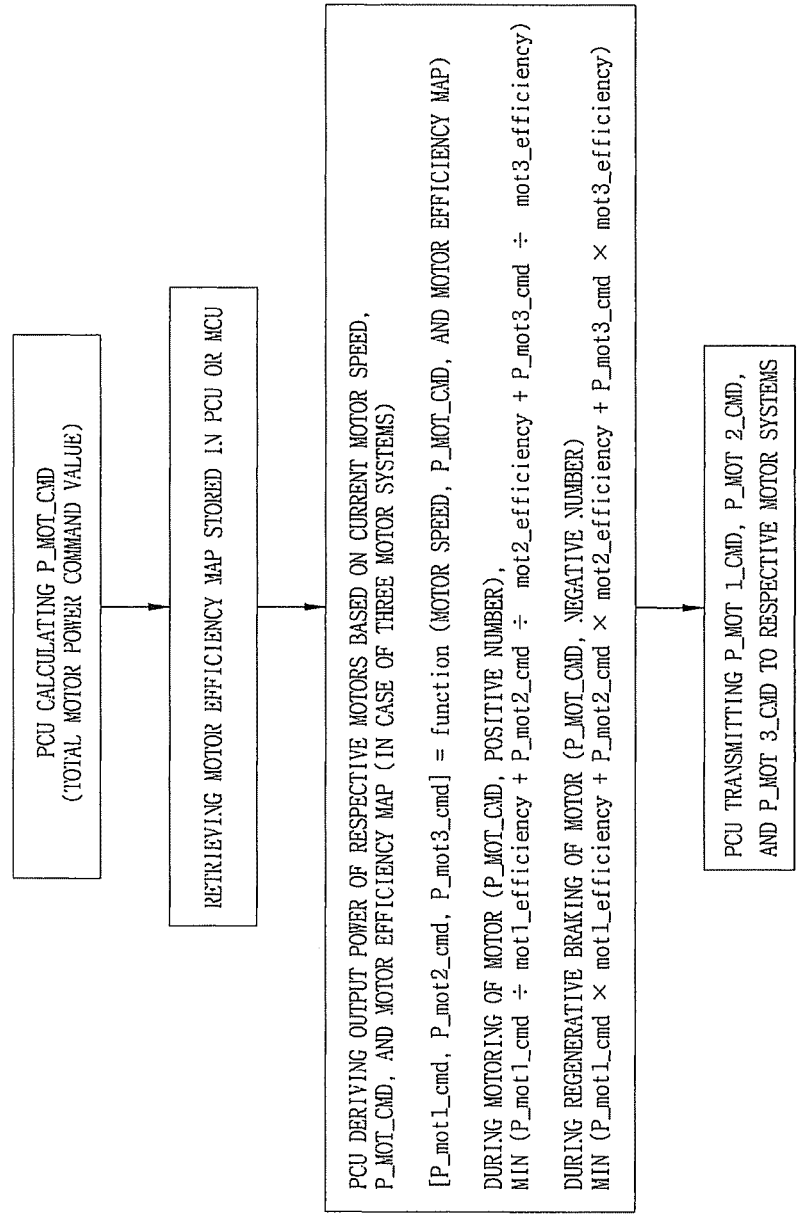
FIG. 11 is a flowchart illustrating the method of controlling the multi-motor system in accordance with a preferred embodiment of the present invention.

The method of controlling the multi-motor system of the present invention will be described in more detail below with regard to FIG. 11.

After it is determined whether the vehicle is operated in the mild mode or the power mode, the output power of the respective motor systems is independently controlled, in consideration of the efficiency of the respective motor systems, to satisfy the total motor power command value.

The total motor power command value is calculated by considering the total available power of the fuel cells and the available power of the auxiliary power source (e.g.; supercapacitor) based on the total drive request power using the motor speed-torque characteristic map.

After the calculation of the total motor power command value, a motor efficiency map stored in the PCU 73 or the MCU 74 is retrieved. The PCU 73 then derives output power of the respective motor systems based on current motor speed, the total motor power command value, and the motor efficiency map.

During motoring (P_mot_cmd, positive number), the respective motors are controlled such that the respective power command values of the respective motor systems are divided by the respective efficiencies of the respective motor systems, the values resulting from the division are added up, the value resulting from the addition is minimized.

Here, dividing the power command values of the respective motor systems by the efficiencies of the respective motor systems during motoring denotes the direction that power supplied from the multi-power source is transmitted to the respective vehicle wheels through the respective motor systems (the output value of the motor is a positive number). Minimizing the resulting value denotes increasing the output power in terms of energy efficiency by minimizing the motor power command values (input values) that control the respective motor systems.

On the other hand, during regenerative braking of the motors (P_mot_cmd, negative number), the respective motors are controlled such that the respective power command values of the respective motor systems are multiplied by the respective efficiencies of the respective motor systems, the values resulting from the multiplication are added up and the value resulting from the addition is minimized.

Here, multiplying the power command values of the respective motor systems by the efficiencies of the respective motor systems during regenerative braking denotes the direction that kinetic energy supplied from the respective vehicle wheels is stored in the auxiliary power source through the respective motor systems (the output value of the motor is a negative number). Minimizing the resulting value denotes increasing the stored energy of the auxiliary power source power in terms of energy storage efficiency by minimizing the kinetic energy (output value) obtained from the respective vehicle wheels (in case of a negative number, the larger the absolute value, the lower the energy).

The present invention will be described in more detail based on the following examples, but the invention is not limited thereto.

COMPARATIVE EXAMPLE

Figure 12A:
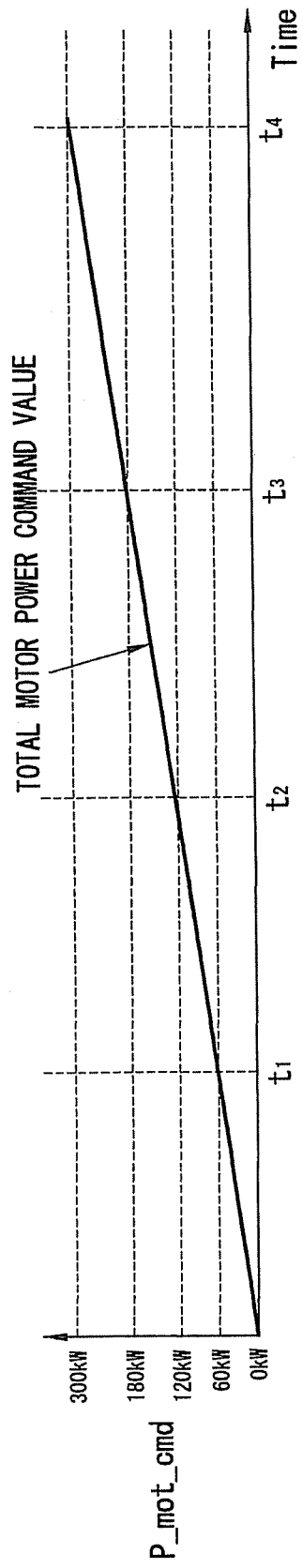
FIGS. 12A to 12C are conceptual diagrams illustrating a method of independently controlling each of motor systems of a multi-motor system in accordance with a preferred embodiment of the present invention.
Figure 12B:
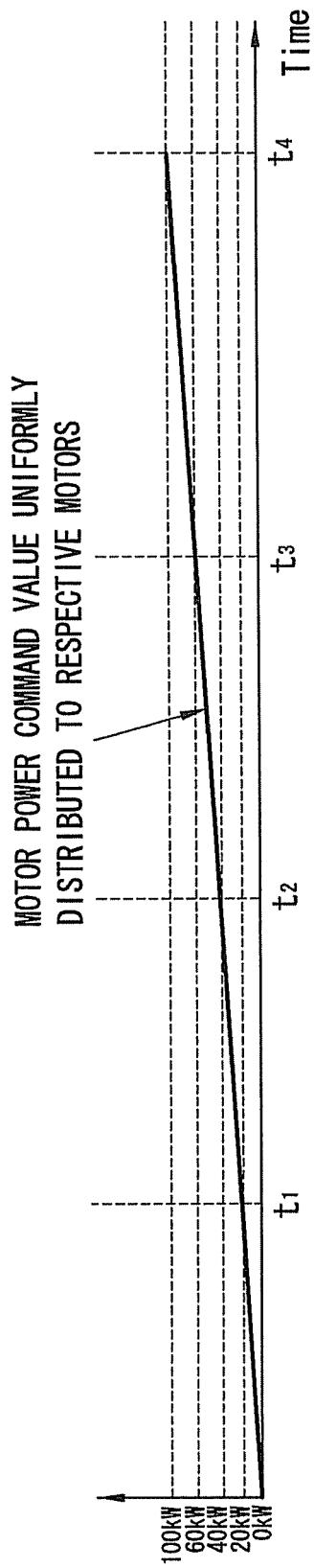
Figure 13A:
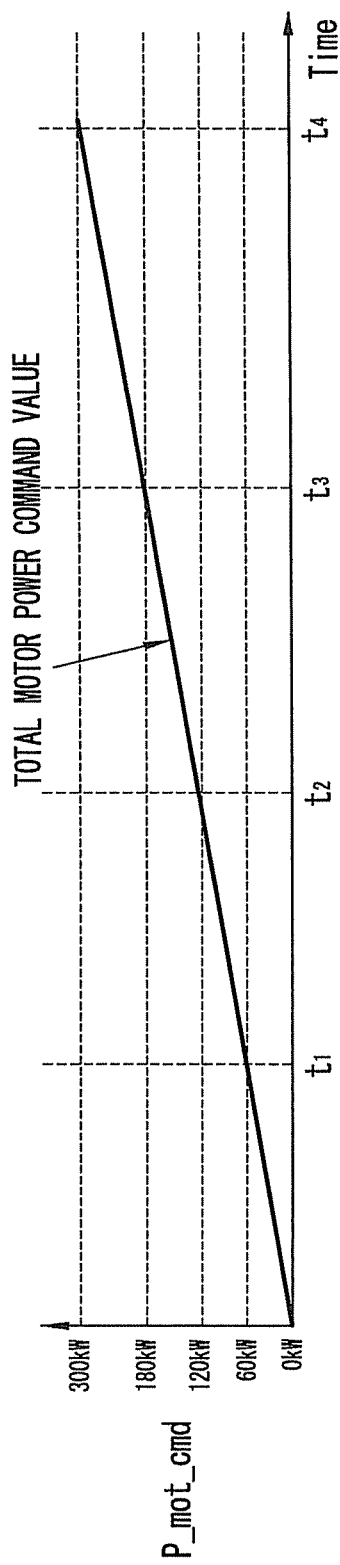
FIGS. 13A to 13C are conceptual diagrams illustrating a method of independently controlling each of motor systems of a multi-motor system in accordance with another preferred embodiment of the present invention.
Figure 13B:
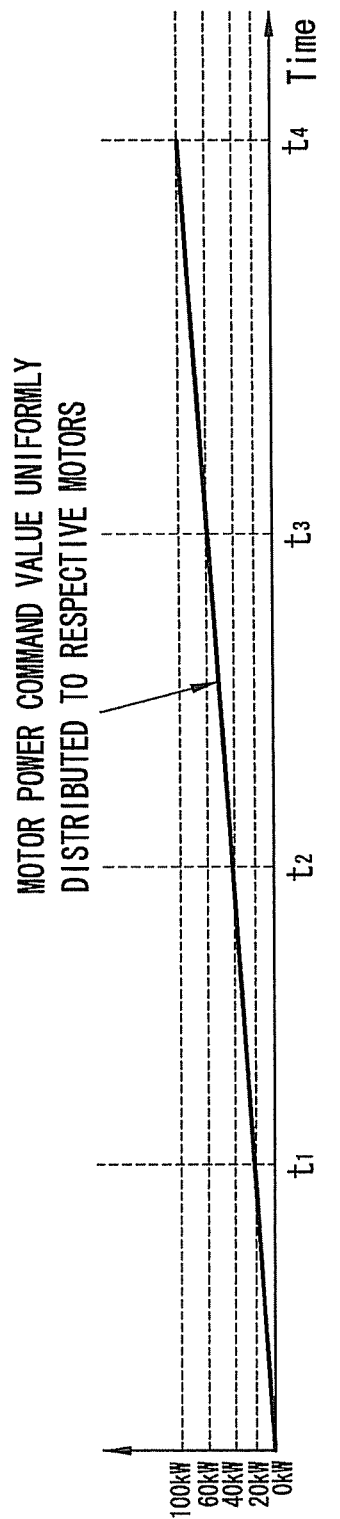

FIGS. 12B and 13B are graphs showing the cases where the total motor power command value is uniformly distributed to the respective motor systems.

Assuming that the total motor power command value (P_mot_cmd) is linearly increased from 0 to 300 kW with the lapse of time, when the total motor power command value was uniformly distributed to three motors, the power command values distributed to the respective motor systems were linearly increased from 0 to 20 kW during the period of 0 to t1, from 20 to 40 kW during the period of t1 to t2, from 40 to 60 kW during the period of t2 to t3, and from 60 to 100 kW during the period of t3 to t4.

Example 1

Figure 12C:
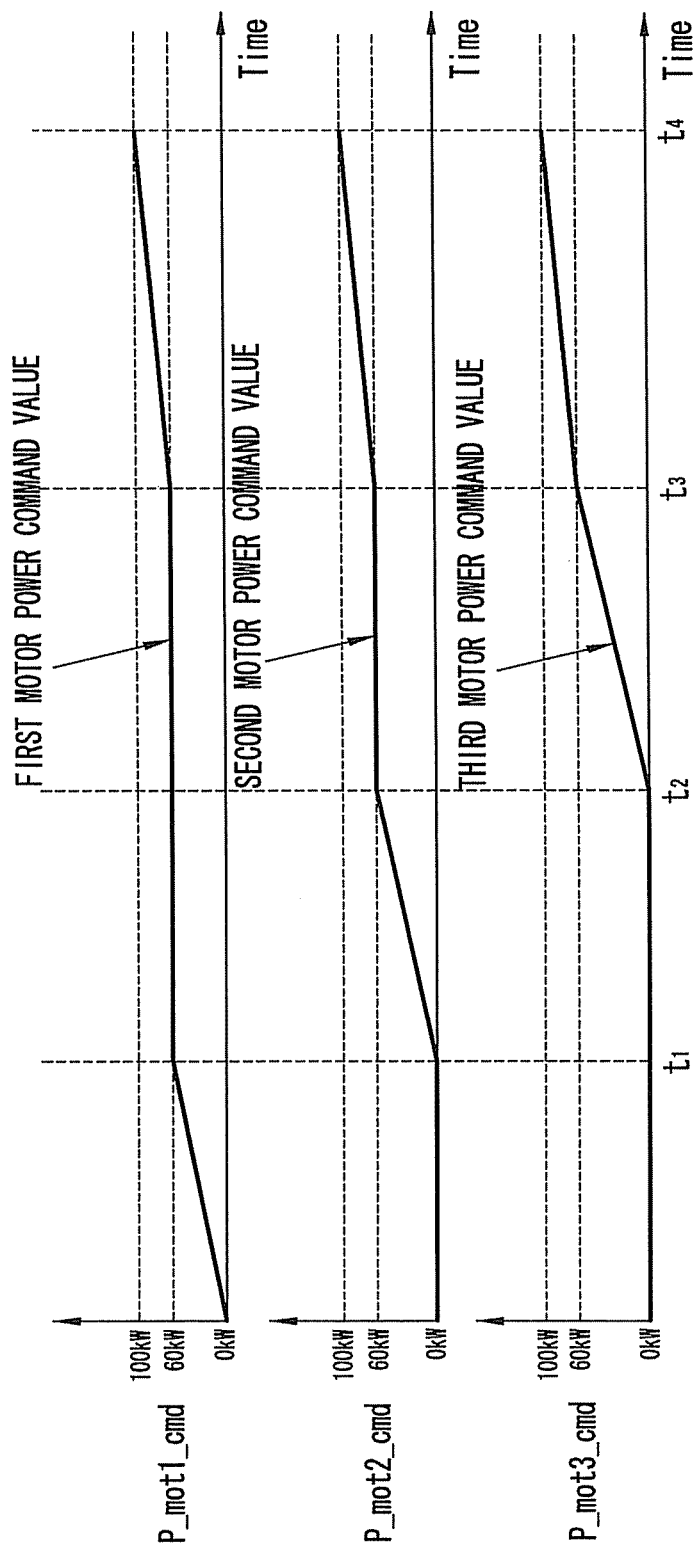

FIG. 12A is a graph showing a total motor power command value of a multi-motor system in accordance with a preferred embodiment of the present invention, and FIG. 12C is a graph showing motor power command values of respective motor systems of the multi-motor system in accordance with the preferred embodiment of the present invention.

Assuming that the total motor power command value (P_mot_cmd) is linearly increased from 0 to 300 kW with the lapse of time, when the three motors were independently controlled with the total motor power command value, the power command value distributed to the first motor was linearly increased from 0 to 60 kW during the period of 0 to t1, 60 kW during the period of t1 to t2, 60 kW during the period of t2 to t3, and from 60 to 100 kW during the period of t3 to t4. The power command value distributed to the second motor was linearly increased 0 kW during the period of 0 to t1, from 0 to 60 kW during the period of t1 to t2, 60 kW during the period of t2 to t3, and from 60 to 100 kW during the period of t3 to t4. The power command value distributed to the third motor was linearly increased 0 kW during the period of 0 to t1, 0 kW during the period of t1 to t2, from 0 to 60 kW during the period of t2 to t3, and from 60 to 100 kW during the period of t3 to t4.

Example 2

Figure 13C:
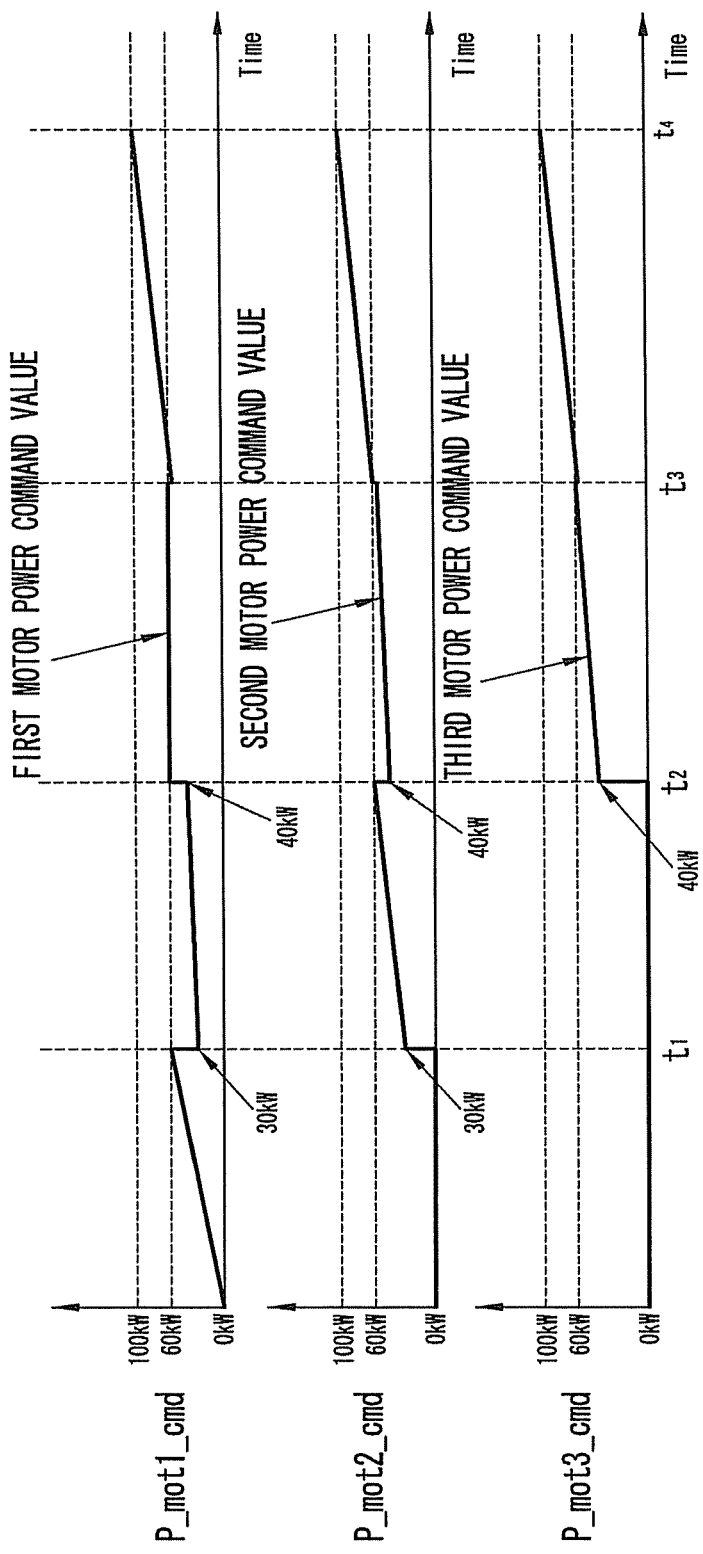
Figure 14:
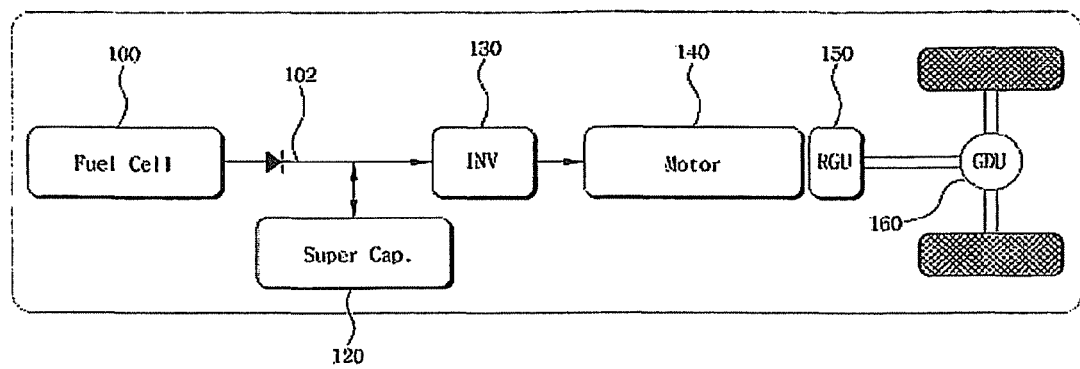
FIG. 14 is a schematic diagram showing a powertrain of a conventional hybrid fuel cell bus.
Figure 15:
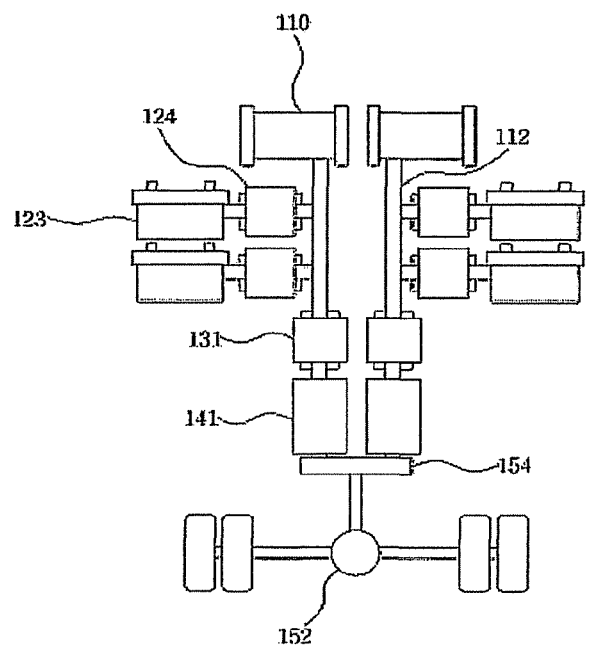
FIG. 15 is a schematic diagram showing a powertrain of another conventional hybrid fuel cell bus.
Figure 16:
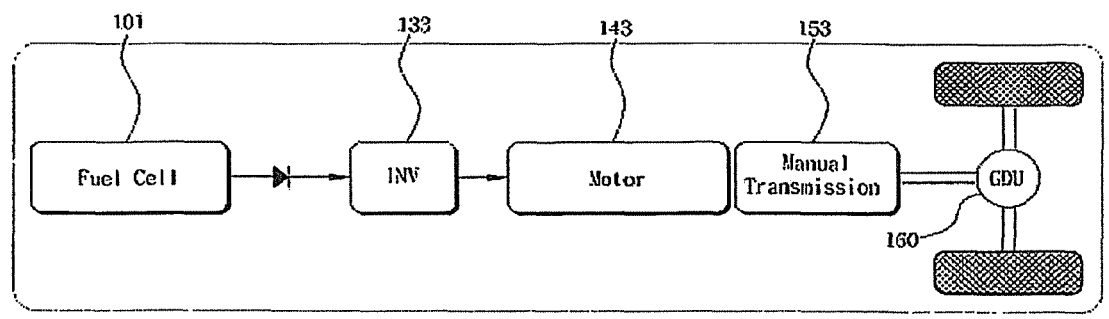
FIG. 16 is a schematic diagram showing a powertrain of still another conventional hybrid fuel cell bus.

FIG. 13A is a graph showing a total motor power command value of a multi-motor system in accordance with another preferred embodiment of the present invention, and FIG. 13C is a graph showing motor power command values of respective motor systems of the multi-motor system in accordance with the preferred embodiment of the present invention.

Assuming that the total motor power command value (P_mot_cmd) is linearly increased from 0 to 300 kW with the lapse of time, when the three motors were independently controlled with the total motor power command value, the power command value distributed to the first motor was linearly increased from 0 to 60 kW during the period of 0 to t1, from 30 to 60 kW during the period of t1 to t2, from 40 to 60 kW during the period of t2 to t3, and from 60 to 100 kW during the period of t3 to t4. The power command value distributed to the second motor was linearly increased 0 kW during the period of 0 to t1, from 30 to 60 kW during the period of t1 to t2, from 40 to 60 kW during the period of t2 to t3, and from 60 to 100 kW during the period of t3 to t4. The power command value distributed to the third motor was linearly increased 0 kW during the period of 0 to t1, 0 kW during the period of t1 to t2, from 40 to 60 kW during the period of t2 to t3, and from 60 to 100 kW during the period of t3 to t4.

As described above, the present invention provides various advantages including the following. First, in the event that one of the power sources or drive systems malfunctions, the other power sources and drive systems connected in parallel to each other are used to perform an emergency operation, thus ensuring safety of the driver and passengers. Second, it provides improved climbing performance, maximum speed, and acceleration and overtaking performance. Third, the material cost can be reduced due to the reduction in the number of the fuel cells. Fourth, the maintenance and repair are convenient and the replacement cost can be reduced. Fifth, it is possible to reduce the overall volume and weight of the multi-drive system. Lastly, it is possible to improve fuel efficiency and operational life of the system.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method of controlling a hybrid fuel cell vehicle with a multi-power source and a multi-drive system, the method comprising:
   determining whether a portion of a plurality of power sources is used or all of the plurality of power sources are used, using a push button by a driver or a driving pattern automatic recognition function by a controller; and
   operating a portion of the plurality of power sources if the vehicle is driven in a mild mode, and operating all of the plurality of power sources if the vehicle is driven in a power mode,
   wherein the plurality of power sources shares a single main bus terminal, the plurality of power sources are connected in parallel to each other, and the driving pattern automatic recognition function is a technique in which a mode used just before a starter key is turned off is stored in a buffer of the controller and then used as it is when the starter key is turned on, or a technique in which a history of modes used just before the starter key is turned off and a history of modes used thereafter are stored in the controller such that the history of modes used just before the starter key is turned off is used as an input and a mode to be used when the starter key is turned on is determined as an output.

2. The method of claim 1, further comprising:
   determining whether a serious defect occurs to be necessary to stop the operation of a portion of the plurality of power sources or a portion of the plurality of drive systems during driving in the mild or power mode; and
   performing an emergency driving mode, if it is determined that the serious defect occurs, by stopping the operation of the portion of the power sources or drive systems and maintaining the operating of the other portion thereof.

* * * * *